United States Patent [19]

Weiss et al.

[11] 4,232,187
[45] Nov. 4, 1980

[54] TELETYPE CHARACTER MODIFICATION UNIT

[75] Inventors: Gerald Weiss, New York; Gerson Scharf, Bronx; Anthony A. Guido, Yonkers; Benjamin Lazardwitz, Bronx, all of N.Y.

[73] Assignee: The United States of America as represented by the Secretary of the Army, Washington, D.C.

[21] Appl. No.: 171,319

[22] Filed: Feb. 5, 1962

[51] Int. Cl.³ .............................................. H04K 9/00
[52] U.S. Cl. ..................................................... 178/22
[58] Field of Search .................... 178/22; 325/132, 32, 325/122

[56] References Cited

U.S. PATENT DOCUMENTS

| | | | |
|---|---|---|---|
| 2,397,057 | 3/1946 | Spencer | 178/22 |
| 2,425,006 | 8/1947 | Rosen | 178/22 |
| 2,458,406 | 1/1949 | Nichols | 178/22 |

*Primary Examiner*—Howard A. Birmiel
*Attorney, Agent, or Firm*—Nathan Edelberg; Jeremiah G. Murray; Anthony T. Lane

EXEMPLARY CLAIM

3. A teletype modification unit comprising: a signal shaper having input means for receiving mark-space teletype pulses; a synchronization circuit coupled to said signal shaper; a plurality of delay means coupled to said synchronization circuit; a space coincidence circuit; a mark coincidence circuit; means to selectively couple said plurality of delay means to said space coincidence circuit, and means to selectively couple said plurality of delay means to said mark coincidence circuit.

13 Claims, 11 Drawing Figures

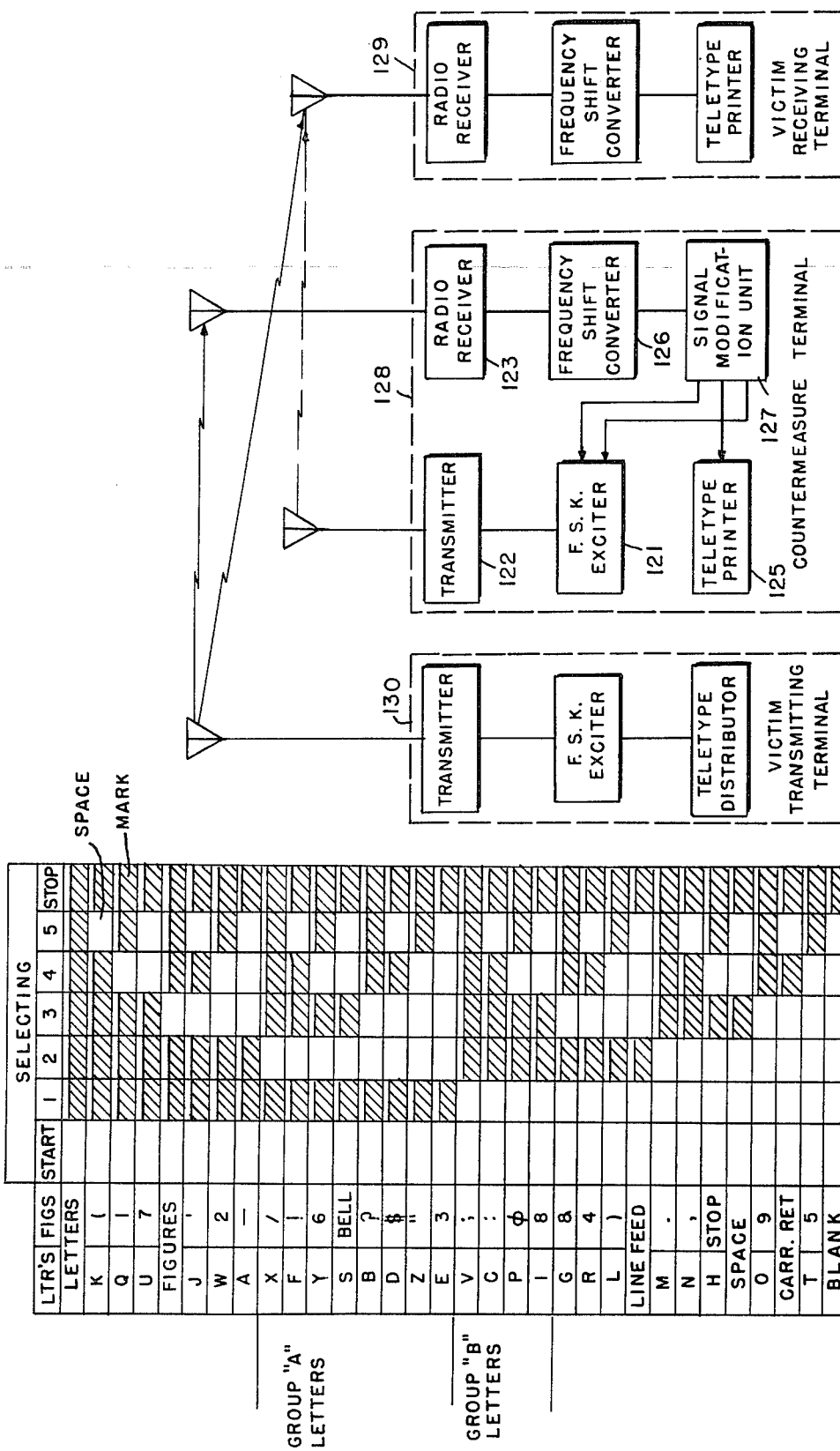

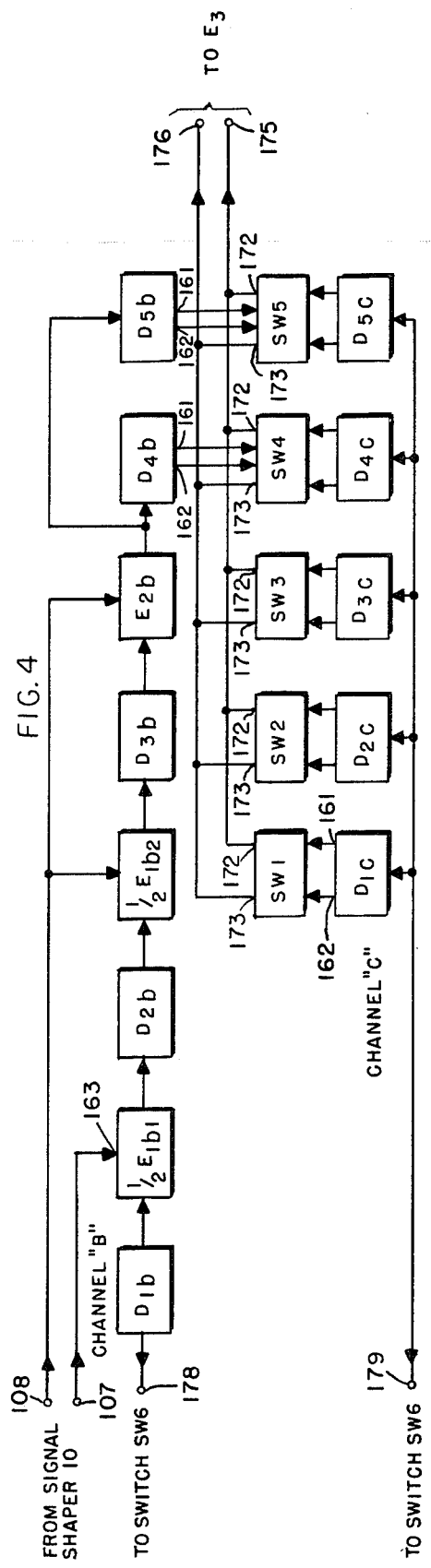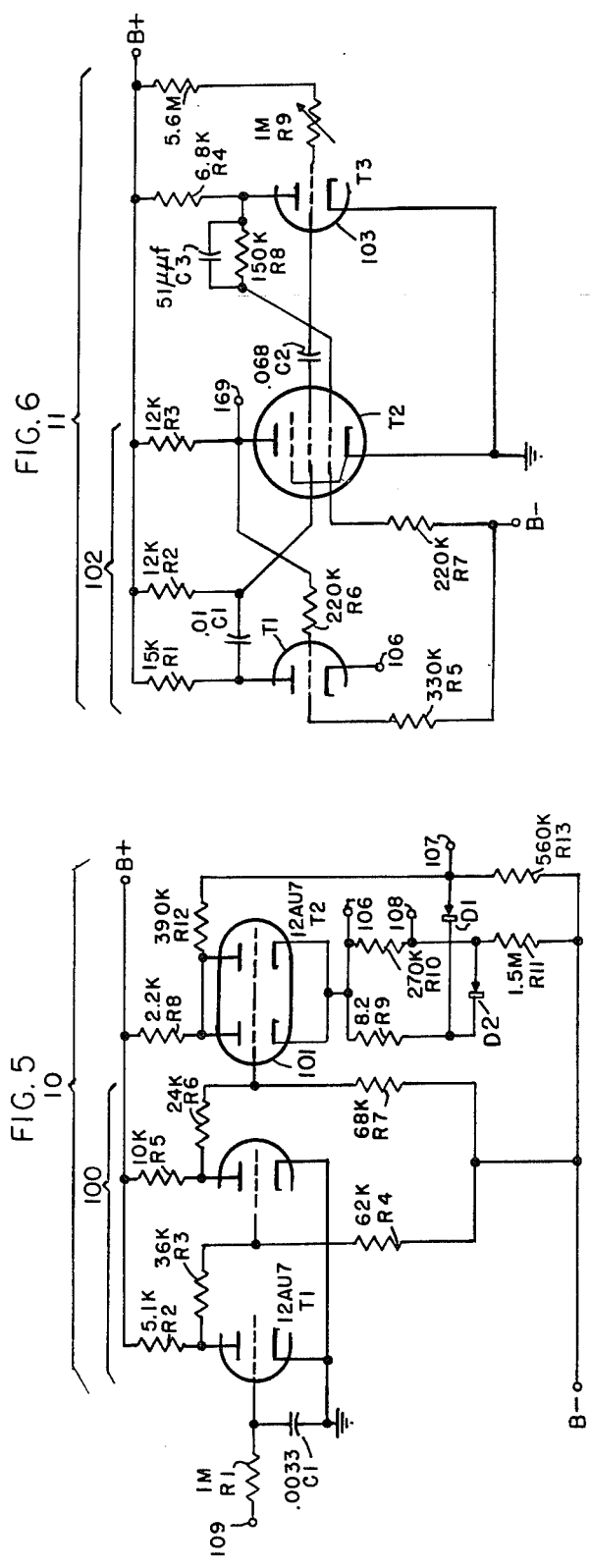

TELETYPE CHARACTER MODIFICATION UNIT

This invention relates to a countermeasures or coding system for use with frequency shift keyed radio teletype transmission, and more particularly relates to a teletype "baud" modifier unit.

The prior art discloses various systems for jamming a radio signal. Perhaps the most common method of disrupting enemy communications of any character is by blanketing the victim's signal with continuous high power signals. The signals are usually modulated by some means such as a noise generator. This technique requires a large power output from the countermeasures transmitter and is readily detected. Furthermore, it prevents monitoring the victim's signal during jamming because any receiver in the vicinity of the jamming transmitter is blanketed as effectively as the victim receiver.

We have invented a jamming method that is efficient from the standpoint of countermeasures transmitter output power, and the victim cannot readily detect the jamming signal under normal operating conditions. In addition, a continuous copy of the victim's signal can be received at the countermeasures site even during the jamming periods. The countermeasures system is the subject matter of copending application Ser. No. 171,320 filed Feb. 5, 1960 and assigned to the assignee of this invention.

This application is directed to a so-called modification unit that is used in the system described in the above cited copending application. The modification unit, however, has utility outside of a countermeasures system in that it can be used as a coding device for transmitting coded radio teletype or wire teletype messages.

The modification unit alters a radio teletype message in accordance with various pre-set programs. The unit compares the baud structure of the marks and spaces of the received signal with the pre-set program. If a difference occurs, the baud that is different is inverted so as to agree with the programmed baud. That is, a space is changed to a mark or a mark to a space, depending upon the program.

If the modification unit is being used in a countermeasures system the countermeasures receiver is disabled, the victim's message is recorded on a teletype printer and countermeasures transmitter transmits a high power pulse of proper width and frequency to invert the baud at the victim receiving site.

On the other hand, if the modification unit is used as a coding device various techniques can be used to transmit the modified message. For example, the message to be coded is applied to the input of the modification unit and the coded output from the unit can be used to cut a teletype tape. The coded tape is then transmitted in a conventional manner. Also the original message can be applied to the modification unit on tape and the output of the modification unit can be directly coupled to a frequency shift keyer. Of course, it is not necessary to use tapes at all. The message can be applied to the modification unit as it is typed by a teletypist.

Therefore, an object of this invention is to provide a teletype signal modification unit.

Another object of this invention is to provide a teletype signal modification unit that is useful in a countermeasures system.

A further object of this invention is to provide a teletype signal coding device.

A still further object of this invention is to provide a modification unit that can be programmed to modify all or a selected number of the standard teletype characters.

An additional object of this invention is to provide a modification unit that can be programmed to make selected modifications of the baud structure of a teletype character.

These and other objects will be more clearly understood from the following description taken in conjunction with the accompanying drawings in which:

FIG. 1 is a teletype code chart.

FIG. 2 is a block diagram of a countermeasures system.

FIG. 4 is a block diagram of a portion of the modification unit.

FIG. 5 is a schematic diagram of the signal shaper used in the modification unit.

FIG. 6 is a schematic diagram of the modification unit synchronization circuit.

Figure 3A:
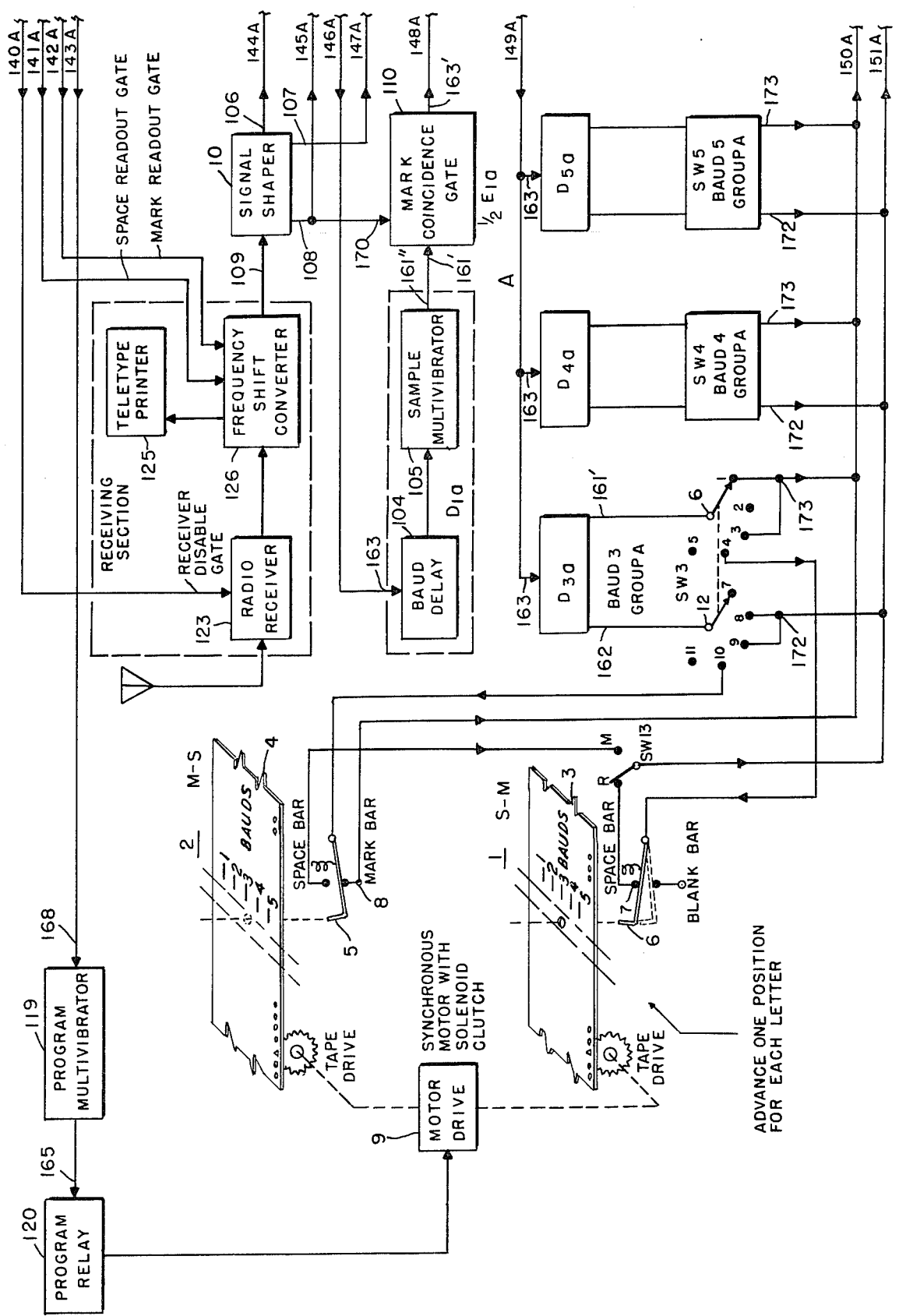
FIGS. 3A and 3B are block diagrams of a countermeasures system with a part of the modification unit shown in detail.

FIG. 1 is a teletype code chart having the letters arranged in binary sequency. The dark portions of the chart indicate marks and the light parts are spaces. All the teletype characters start with a space and end with a mark (i.e. start - stop pulses). The remaining five bauds or time intervals are used to establish the characters. From the chart it is apparent that some of the teletype characters fall into groups having similar mark-space sequences. For example the letters "x" through "E" all have a mark in the first interval and a space in the second interval. Likewise the characters "V" through "line-feed" all have a space in the first interval and a mark in the second interval. As will become apparent later, it is the ability to group the characters having similar mark-space sequences that makes selective modification of a teletype message possible.

FIG. 2 shows a complete countermeasures system. As was mentioned above, this system is the subject matter of another application; however, a brief description of the system will facilitate a clear understanding of the operation of the modification unit. The teletype message that is to be altered is transmitted at the victim's transmitting terminal 130. Radio receiver 123 at countermeasure terminal 128 receives the victim's message and applies the frequency-shift signal to converter 126. The converter changes the frequency-shift signals to mark-space current pulses. The current pulses are applied to modification unit 127. The modification unit is programmed to make either random or selected changes in the baud structure of the victim's message. For example, assume that only those letters having a mark in the first interval and a space in the second interval are to be changed. Also assume that only the marks after the second interval are to be changed. That is, all the marks after the second interval are to be changed to spaces and the spaces are not changed. If the letter "D" is received, it will be changed to the letter "E". As soon as unit 127 makes the change, receiver 123 is disabled and exciter 121 keys transmitter 122. Transmitter 122 sends out a space pulse which is received at the victim's receiving site 129. The space pulse transmitted by transmitter 122 is of sufficient amplitude to blanket the mark pulse originally transmitted by the victim transmitter. Due to the time delay introduced by the countermeasures equipment the pulse transmitted by transmitter 122 is received by the victim's receiver a short time after the leading edge of the original mark pulse is received; however, this time delay is too short for the victim's receiving equipment to sense the pulse from the victim's transmitter rather than the pulse from transmitter 122. The bandwidth of a teletype receiver is generally inherently narrow to limit noise interference and to conserve spectrum space. Thus, any pulse which occupies the major portion of a normal baud will satisfactorily operate the teletype receiving equipment, and slight variations in pulse width are relatively unimportant. The pulse from transmitter 122 has a slightly shorter time duration than a standard teletype pulse so that it will not overlap the succeeding pulse.

Transmitter 122 is on the air only when modification unit 127 changes the baud structure of the victim's message. This intermittent keying of the transmitter results in a much smaller power consumption than is normally used by a countermeasures system.

Another desirable feature of the system of FIG. 2 is the ability to obtain a continuous copy of the victim's signal. This is accomplished by providing an unmodified output from unit 127 to printer 125.

Figure 3B:
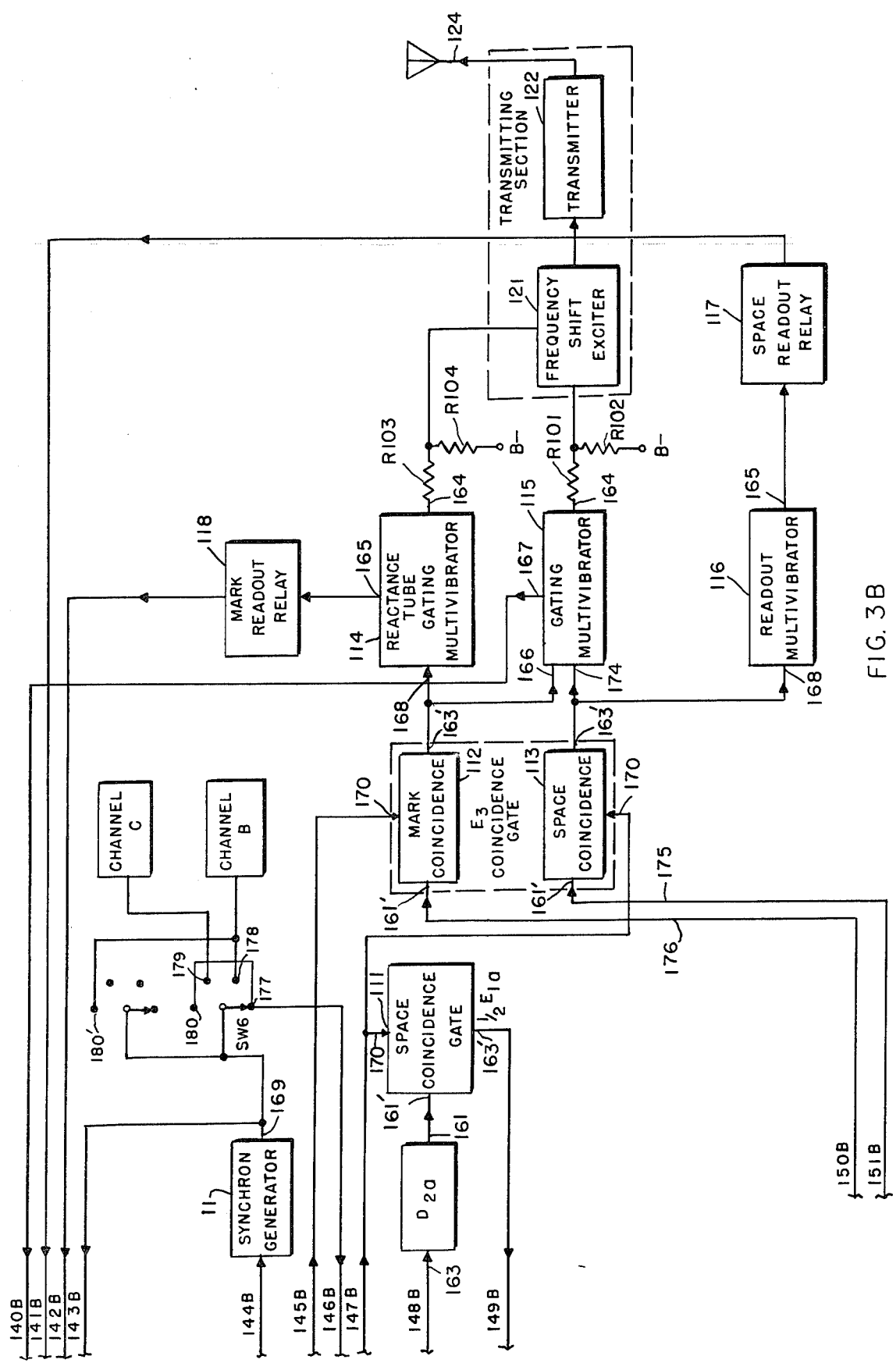

FIGS. 3A, 3B and 4 show the modification unit in detail. FIGS. 3A and 3B combine to form one complete diagram. The interconnections of FIGS. 3A and 3B have been assigned corresponding "A" and "B" numbers to facilitate proper combination of the drawings. As can be seen from these figures, the modification unit has three channels. These channels are labelled "A", "B", and "C". Channel A is shown in detail in FIGS. 3A–B and channels B and C are shown in detail in FIG. 4.

The detailed description of the modification unit will be limited to its operation as a countermeasures device; however, it is to be remembered that the description also applies to the operation of the modification unit when it is used as a coding device.

The modification unit can be programmed in a fixed or a random program. If a fixed program is chosen and applied to the third, fourth, and fifth intervals of a group of teletype characters, there will be 63 different patterns or programs of countermeasures. This can be deduced from the fact that four decisions are available for any combination of the three intervals, which results in 64 different combinations ($4^3$). One of the combinations yields no deception. If a given program of deception is chosen, it remains fixed for all permissible teletype characters over the period of time for which countermeasures are applied. For a future countermeasure period there is the option to utilize any one of the existing fixed programs. The four available decisions for any one of the intervals are:

a. Change a MARK to a SPACE but do not change a SPACE to a MARK.

b. Change a SPACE to a MARK but do not change a MARK to a SPACE.

c. Change a MARK to a SPACE and a SPACE to a MARK.

d. Do not make any changes.

Obviously, an enemy could decipher a fixed program by projecting the patterns into the future, if the program is maintained for a long period of time. When coding or countermeasures are to be maintained for a long period of time a random program may be desirable. The random programming technique incorporates as the countermeasure period the time duration of one teletype character. At the beginning of each teletype character a fixed program decision is made by the use of programming tape. The fixed program is maintained throughout the entire character and changed to another of the 63 available programs at the beginning of the next character. The choice of program is on a random basis.

When the decision has been made to use either a fixed or a random program, the next question is: should all or only selected characters be changed? While the decision as to whether or not all the characters should be changed may be an arbitrary one, it also depends upon the type of message that is being transmitted by the victim. If the victim's message is coded in such a manner that machine functions are included in the text, then all the characters can be changed without alerting the victim to the fact that someone or something is interfering with his transmission system. On the other hand, if only letters are included in the text, the countermeasures system to be most effective should make only those changes that will not result in a machine function. Referring again to the chart of FIG. 1, it can be seen that no machine function has the signal sequence of a mark in the first interval followed by a space in the second interval. The letters having this signal sequence are x,f,y,s,b,d,z and e, and will hereinafter be referred to as Group "A" letters. Similarly, no machine function has the signal sequence of a space in the first interval followed by a mark in the second and third intervals. The letters—hereinafter referred to a Group "B" letters—having this signal sequence are v, c, p, and I. Thus if any change is made in the 3, 4, or 5 interval of the Group A letters or the 4 or 5 interval of the Group B letters no machine function will result from the change. For example, if it is decided to change all the marks in the 3, 4, and 5 intervals of the Group A letters without changing the spaces, the letter "s" would be changed to the letter "e".

There are other letters or groups of letters, such as w and a, that have signal sequences not possessed by a machine function. Any change in the fifth time interval of the letters w and a will not result in a machine function; however, as will become apparent later, the additional circuitry that would have to be added to the modification unit does not make it practical to utilize these letters.

Channels A and B of the modification unit correspond to letter groups A and B respectively. When group A letters are to be changed only channel A is used. Similarly channel B is used when only group B letters are to be changed. Thus, with both channels A and B a total of 12 letters can be changed without a resulting machine function. The third channel, channel "C" is utilized when all 32 teletype characters are changed without regard to machine functions.

Referring now more particularly to FIGS. 3 and 4, the channel to be used is selected by switch SW-6.

Switch 6 is wired in such a manner that any one of the three channels can be used independently or channels A and B can be used together. Switches SW-1 through 5 determine in which interval a baud inversion will be made and what type of change will be made. A baud inversion can be made in any, or all of the time intervals, or in any combination of intervals; however, changes are permissible only in intervals 3, 4, and 5 of group A letters and intervals 4 and 5 of group B letters because the remaining intervals are needed for recognition purposes. Switch SW-3 is shown in detail in FIG. 3. In this and the remaining 4 switches position 1 gives an unidirectional change of mark to space, position 2 gives a unidirectional change of space to mark, position 3 gives a bidirectional change, position 4 connects to an external program, and position 5 gives no change.

Positions 4 and 10 of switches 1 through 5 connect to transmitter distributors 1 and 2 respectively. The transmitter distributors are used to set up an external program. A prepunched tape is used with each of the distributors. Tape 3 provides for space to mark changes and tape 4 provides for mark to space changes.

Distributors 1 and 2 are conventional teletype distributors except for minor wiring modifications. Five single-pole double-throw switches, such as 5 and 6, one per information baud, are associated with each distributor. Only one switch for each distributor is shown in FIG. 3. The output from distributor 1 for the first baud is applied to space coincidence gate 113 of gate E$_3$ through contact 7 of switch 6 and the first baud output of distributor 2 is applied to mark coincidence gate 112 through contact 8 of switch 5. If no hole appears in tape 4 for the position of the baud in question, then a unidirectional change of mark to space is imposed. If a hole appears no change is made. If a hole appears in tape 3 a unidirectional change of space to mark is imposed. If no hole appears no change is made. Thus, if a hole appears in tape 3 and no hole in tape 4, a bidirectional change is imposed. Conversely if a hole appears in tape 4 and no hole in tape 3, no change is imposed. A common synchronous motor drives both distributors in order to insure that they will operate in synchronism. The distributors are synchronized with the victim signal so that the tapes advance properly with each new character. The method of synchronizing the tapes with the victim's signal will be described later.

Figure 7:
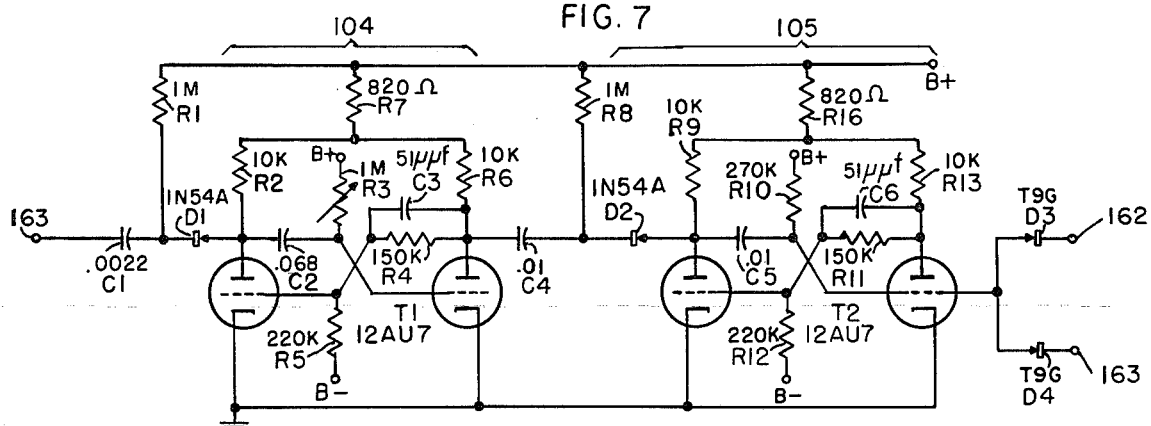
FIG. 7 is a schematic diagram of the interval delay and sample multivibrator circuits used in the modification unit.

After the decision has been made as to what type of program will be used and the switches have been properly set, the modification unit is ready for operation. Operation of the modification unit will be described with reference to FIG. 3. For simplicity, FIG. 3 shows only channel A in detail. Thus, the discussion for the present will be limited to channel A operation. The circuits making up several of the units such as D$_1$a, D$_2$a, D$_3$a, D$_4$a and D$_5$a are substantially identical, and are represented by a single figure of the drawing (FIG. 7 for the D units). The inputs and outputs of these units are numbered to correspond with the connections in FIG. 3. FIG. 3 shows that some of the D units do not use all of the connections shown in FIG. 7. The reason for this becomes apparent by reading the description of the operation of the modification unit.

Before the countermeasures system can operate properly, it must be synchronized with the incoming victim signal. Synchronization is obtained by means of signal shaper 10 and sync generator 11. All teletype characters start with a space pulse and end with a mark pulse. These pulses are called the stop-start pulses and are used to synchronize the modification unit with the incoming signal.

Synchronization is obtained in a manner similar to that used by a standard teletype system. When turned on initially, the modification unit and the victim's signal will probably be out of synchronization. After several letters have been transmitted, the modification unit will normally adjust, via a slipping action, to be in synchronization with the victim signal.

Basically, the synchronization system employed in module 11 is composed of a monostable multivibrator 102 and an amplifier 103 as is shown in FIG. 6. Multivibrator 102 is triggered by a negative pulse at 106 from signal shaper 10 and remains in the excited state for about 147 milliseconds. The negative trigger may result from either a mark-space sequence or a stop-start sequence since these are similar. If after the equipment is turned on, a mark-space sequence appears, the synchronization multivibrator will be triggered and will not be activated by another pulse for 147 milliseconds, or until the corresponding interval of the next letter. Statistically, a mark-space sequence for any given two consecutive intervals appears one time in four. Hence, the triggering point will normally slip until the stop-start sequence is reached. Since the stop-start pulse always exists, the system will remain in synchronization once this condition has been established.

Signal shaper 10 (FIG. 5), comprising a conventional two-stage amplifier 100 and cathode follower 101 (FIG. 5) operating between plate current cut-off and saturation, serves to shape the input signal leading and trailing edges. The input to-synchronization generator 11 is taken from terminal 106. A negative pulse appears at this point when a mark-space sequence is applied to input terminal 109. Any other sequence will not produce a negative pulse at terminal 106. As will be explained later, shaper 10 also provides the inputs 108 and 107 for the mark and space coincidence circuits 110 and 111 of gate E$_1$a.

When the synchronization multivibrator is triggered by a mark-space sequence a positive sync pulse is produced at the output of synchronization generator 11. This positive pulse occurs simultaneously with the beginning of the start pulse and is used to operate the remaining circuitry.

The synchronization pulse from 169 is applied to delay circuit D$_1$a at 163. Delay circuit D$_1$a comprises a baud delay multivibrator 104 and a sample multivibrator 105. As shown in FIG. 7, these multivibrators are conventional delay multivibrators. Baud delay multivibrator 104 produces a pulse whose leading edge occurs simultaneously with the synchronization pulse and whose trailing edge occurs at the beginning of the first information baud. The trailing edge of the baud delay multivibrator output pulse triggers sample multivibrator 105. The sample multivibrator produces a pulse at outputs 161 and 162 having a duration of about four milliseconds. This four millisecond pulse begins at the start of the first information baud and is applied through output 161 to input 161' of coincidence gate 110 of gate E$_1$a. A second input from terminal 108 of signal shaper 10 is applied to input 170 of mark coincidence gate 110. If the letter received is a group A letter the first information baud will be a mark. Thus, a mark pulse in the first interval will coincide with the four millisecond pulse from sample multivibrator 105 and an output pulse will be produced by coincidence gate 110. This output at 163' from mark gate 110 is applied to delay circuit $D_{2a}$. Delay circuit $D_{2a}$ is similar to delay circuit $D_{1a}$, and introduces a delay in the output signal from gate 110. The delay introduced by $D_{2a}$ is of sufficient duration to allow the output 161 from its sample multivibrator to coincide with the beginning of the second information baud. The output 161 of delay circuit $D_{2a}$ is applied to space coincidence gate 111.

If the letter is a group A letter the second baud will be a space pulse. This space pulse is applied to space gate 111 from terminal 107 of signal shaper 10. A space pulse in the second baud satisfies the required coincidence in gate 111 and an output at 163' is produced by this gate. The output pulse from space gate 111 is applied to delay circuits $D_{3a}$–$D_{5a}$ at each of their input terminals 163.

If the pulse sequence that is received is other than the mark-space sequence of group A letters no output will appear from space gate 111. From the foregoing remarks it should be apparent that delay circuits $D_{1a}$ and $D_{2a}$, and gate $E_{1a}$, are used to recognize group A letters.

Figure 8:
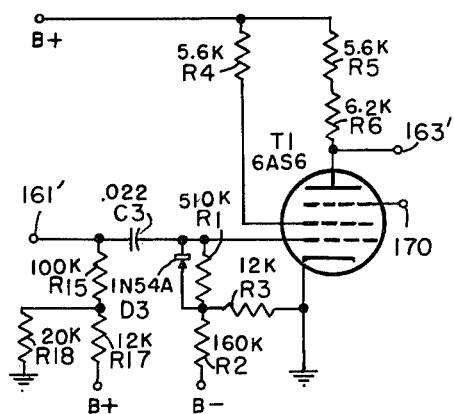
FIG. 8 is a schematic diagram of the mark-space coincidence circuits of the modification unit.

Identical circuit structure is used for mark and space gates 110 and 111. This circuitry is shown in FIG. 8. The amplifier shown in FIG. 8 is normally non-conductive and is gated on by the coincidence of two input pulses at inputs 161' and 170.

Delay circuits $D_{3a}$, $D_{4a}$, and $D_{5a}$ all receive their input signals from gate $E_{1a}$ and are similar in structure to delay circuits $D_{1a}$ and $D_{2a}$. However, delay circuits $D_{3a}$ through $D_{5a}$ are adjusted to introduce progressively longer delays. That is, delay circuit $D_{3a}$ produces an output that occurs simultaneously with the beginning of the third baud, whereas, delay circuit $D_{4a}$ does not produce an output until the beginning of the fourth baud and $D_{5a}$ produces an output at the beginning of the fifth baud.

Delay circuits $D_{3a}$ through $D_{5a}$ have their outputs 161 and 162 connected to switches SW-3 through SW-5 respectively. Only switch SW-3 is shown in detail in FIG. 3 since switches SW-4 and SW-5 are identical to switch SW-3. Diodes D3 and D4 in the respective outputs of the delay circuits (FIG. 7) provide isolation between these two output circuits. Switches SW-1 and SW-2 do not appear in FIG. 3 since, in channel "A" operation for group A letters, no baud changes are permissible for the first two baud intervals, controlled by delay circuits $D_{1a}$ and $D_{2a}$.

In FIG. 3 switch SW-3 is shown as being set in position 1. This position gives a unidirectional change of mark to space. Position 2 gives a unidirectional change of space to mark. Position 3 gives a bidirectional change. Position 4 is used for external programming and position 5 gives no change. The remaining switches SW-4 and SW-5 (not shown in detail) are identical to SW-3. The respective outputs 172 and 173 of these switches are connected to common lines leading to coincidence gate $E_3$.

If the third baud of the received letter is a mark, then the mark pulse applied to input 170 of mark coincidence gate 112 from terminal 108 of shaper 10 will coincide with the pulse applied to input 161' of gate 112 from delay circuit $D_{3a}$. The coincidence of these two pulses will produce an output from coincidence gate $E_3$. Coincidence gate $E_3$ is identical in structure to gate $E_{1a}$, shown in detail in FIG. 8.

Figure 9:
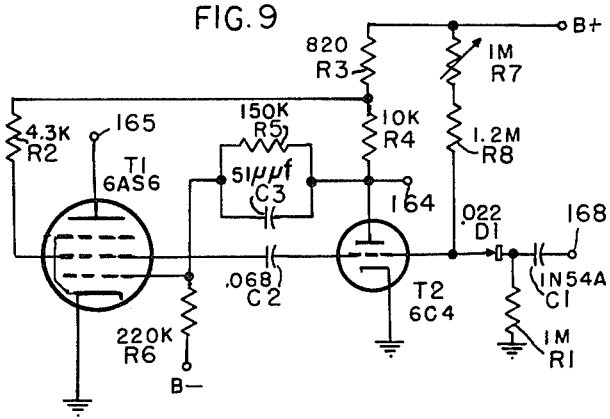
FIG. 9 is a schematic diagram of the reactance tube and polar relay gating circuits of the modification unit.
Figure 10:
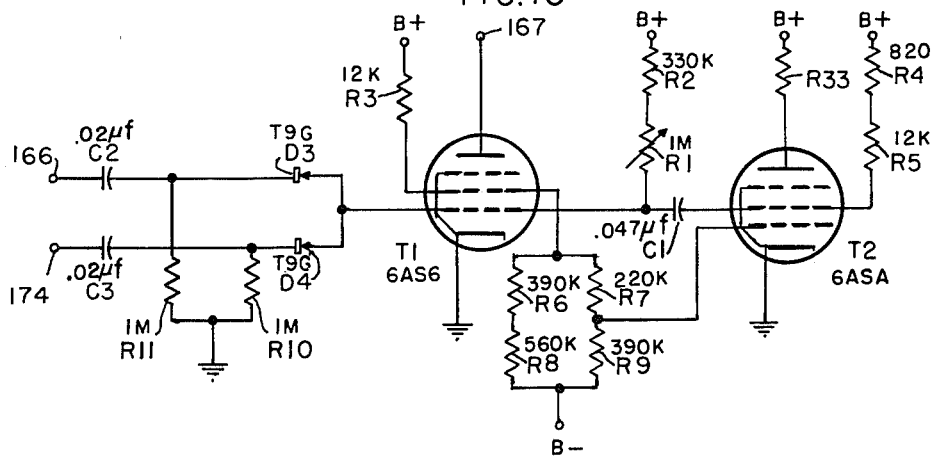
FIG. 10 is a schematic diagram of the radio receiver disable gating and the F.S.K. exciter gating circuits of the modification unit.

The output 163' from gate 112 is applied at 168 to reactance tube gating multivibrator 114. Multivibrators 114, 116, and 119 are conventional and alike, and are shown in FIG. 9. Multivibrator 115 is also a conventional multivibrator and is shown in schematic form in FIG. 10. The output 164 from multivibrator 114 is applied through resistor R103 to the reactance tube circuit of frequency shift exciter 121. Exciter 121 turns on transmitter 122. At the same time receiver 123 is disabled by an output pulse at 167 from gating multivibrator 115. Exciter 121 and transmitter 122 are pretuned so that an output pulse from multivibrator 114 will produce a space pulse on antenna 124.

The operation of the modification unit is essentially the same for space-to-mark conversion as it is for mark-to-space-conversion. If any of the switches SW-3, 4 or 5 are set to produce the space-to-mark conversion and a space appears in a corresponding baud, the output from that switch will be applied at 161' to space coincidence gate 113. The second input 170 to gate 113 is derived from shaper 10. Coincidence of the two signals applied to gate 113 produces an output at 163' from this gate. This output is applied at 174 to gating multivibrator 115. Multivibrator 115 turns on exciter 121 and this in turn pulses transmitter 122. Under these conditions transmitter 122 transmits a mark pulse. As was the case in the mark-to-space conversion, receiver 123 is disabled by multivibrator 115 when a space-to-mark conversion takes place.

Readout multivibrator 116 and relays 117 and 118 are provided to obtain an unmodified copy of the victim's message. The mark pulse for copying the victim's signal is obtained from multivibrator 114 and is applied to printer 125 through readout relay 118 and converter 126. The space pulse is obtained from space gate 113 and is applied to printer 125 through multivibrator 116, relay 117 and converter 126. Relays 117 and 118 are conventional polar relays.

It was previously mentioned that an external program can be used. Tapes 3 and 4 are used to provide this external program. The advantage of an external program lies in the fact that the program can be changed from letter to letter. That is, a different change can be made in any or all, or any arrangement of the bauds for each individual letter. Also, this change can be made at random. This random letter-to-letter program is obtained by having different arrangements of holes and unperforated sections in tapes 3 and 4. In order for the program to change from letter to letter tapes 3 and 4 must advance at the end of each received letter. The tapes are advanced by means of program multivibrator 119, program relay 120 and motor drive 9. At the end of each letter an output pulse from generator 11 is applied to motor 9 through multivibrator 119 and relay 120. This pulse turns on motor 9 for a sufficient time to advance the tapes one letter position. As will be explained later, tape 4 can be used to substitute an entire message for the victim's message.

Referring now to FIG. 4, channel "B" operates in essentially the same way as channel "A"; however, an additional coincidence gate is needed for recognition in channel B. Group B letters are characterized by a space in the first interval and marks in intervals 2 and 3. Thus, the first three time intervals or bauds must be used for recognition purposes, as are the first two bauds of group "A" letters. In channel "B" the output of delay circuit $D_{1b}$ is applied to the space coincidence gate of $E_1b_1$ and the output of delay circuit $D_{2b}$ is applied to the mark coincidence gate of gate $E_1b_2$. The output of delay circuit $D_{3b}$ is applied to gate $E_{2b}$. Gate $E_{2b}$ consists only of a mark coincidence circuit since the third baud is a mark. Thus, delay circuits $D_{1b}$, $D_{2b}$ and $D_{3b}$ are used to recognize group B letters and changes can be made only in the fourth and fifth bauds of these letters. Accordingly, delay circuits D₄b and D₅b are the only delay circuits coupled to the program switches. As is shown in FIG. 4, these delay circuits are connected to decks of switches SW-4 and SW-5 identical with the deck of SW-3 shown in FIG. 3, with similar connections.

Channel "C" is provided to change all the teletype characters without regard to whether or not a machine function will result. Since no recognition is required for channel "C" operation, the channel does not have any coincidence gates. Channel "C" is comprised of five delay circuits $D_1c$ through $D_5c$ which are connected to decks switches SW-1 through SW-5 respectively, these decks being similar to that of SW-3 in FIG. 3, with similar connections. The operation of channel "C" is similar to the operation of channels "A" and "B".

Referring again to FIG. 3, if all five of the program switches are set to their "external" positions and switch SW-6 is set for channel "C" operation, any desired message can be substituted for the victim's message. In addition to the mentioned settings of switches SW-1 through SW-6, switch SW-13 must be set to contact M. This disables distributor 1 and essentially converts each finger of distributor 2 to a double-pole-double-throw switch. Delay circuits $D_1c$ through $D_5c$ are now connected to baud fingers 1 through 5 of distributor 2. (Only one finger 5 is shown). A hole in the tape above the baud finger in question represents the desired insertion of a mark in the victim signal while no hole represents the insertion of a space.

Tape 4 is prepunched with the desired message and placed on distributor 2. When the system is synchronized with the victim's message by means of synchronization generator 11, distributor 2 is turned on and the system is ready to operate. Under these conditions the outputs from delay circuits $D_1c$ through $D_5c$ are not used because the inputs to the mark and the space coincidence circuits of gate $E_3$ are now derived from switch 5 and signal shaper 10. Thus, in effect there are four channels provided by the modification unit, channels A, B, and C; and the channel provided distributor 2 when operated in the manner just described. In addition, channels A and B can be operated simultaneously by setting SW-6 on contacts 180 and 180'.

The modification unit has been described only with reference to a countermeasures system. This description also applies when the unit is operated as a coding device. The only difference is that the signal being modified is locally generated rather than received from a distant transmitter. The receiving site presets its modification unit in such a manner that the changes made by the coding unit are cancelled by the receiving modification unit and the clear text is printed on a standard printer.

Various other features can be added to the modification for testing and checking purposes. In fact, one complete modification unit has a test section and an error rate detector. These circuits are not shown in the drawings and are not claimed.

The test section is used to align the modification unit with the victim's signal for optimum operation. This is accomplished by storing the victim's signal on tape and aligning the countermeasures system during a period when no countermeasures are being effected. Using this procedure insures optimum operation because the modification unit is aligned with the victim's signals. While teletype signals are essentially standard there are variations from one system to another system that could become cumulative and cause improper operation of the countermeasures equipment, particularly the timing operations.

The error rate detector compares the modified baud with a baud that represents what the modified baud should be. If the two are not the same, any suitable meter can be used to indicate the error. The system should operate with little or no error. Thus, an indication of a large number of errors means that the countermeasure equipment is not functioning properly due to either improper alignment, or failure of some of the circuits.

While this invention has been described with reference to a particular embodiment of the invention, other variations and modifications will be apparent to those skilled in the art; therefore, we intend to be restricted only by the limitations set forth in the following claims.

We claim:

1. A teletype baud modification unit comprising: a signal shaper having input means for receiving teletype mark-space current pulses; a synchronizing circuit coupled to said shaper; means coupled to said synchronizing circuit and to said shaper for producing an output pulse only when the first two information bauds of a teletype character have the mark-space sequence of a mark followed by a space; first, second, and third delay means coupled to said output pulse producing means; a mark coincidence gate; a space coincidence gate; switching means to selectively couple all said delay means to said mark coincidence gate and to said space coincidence gate; a first gating multivibrator coupled to said mark coincidence gate; and a second gating multivibrator coupled to said space coincidence gate.

2. A teletype baud modification unit comprising: a signal shaper; input means for applying teletype character pulses to said shaper, said teletype characters each having start-stop pulses and five information pulses; a synchronizing circuit coupled to said shaper; means coupled to said synchronizing circuit and to said shaper for producing an output pulse only when the mark-space sequence of the first three of said five information pulses is space-mark-mark; first and second delay means coupled to said pulse producing means; a mark coincidence gate coupled to said first and second delay means; and a space coincidence gate coupled to said first and second delay means.

3. A teletype modification unit comprising: a signal shaper having input means for receiving mark-space teletype pulses; a synchronization circuit coupled to said signal shaper; a plurality of delay means coupled to said synchronization circuit; a space coincidence circuit; a mark coincidence circuit; means to selectively couple said plurality of delay means to said space coincidence circuit, and means to selectively couple said plurality of delay means to said mark coincidence circuit.

4. A teletype character modification unit comprising: a signal shaper having an input for receiving said teletype characters, said teletype characters consisting of a start pulse, five mark-space information pulses and a stop pulse; a synchronization circuit coupled to said signal shaper; means coupled to said synchronizing circuit and to said shaper for producing an output pulse only when the mark-space sequence of the first two of said information pulses is mark-space; and means coupled to said output pulse producing means for changing the mark-space sequence of the last three of said five information pulses according to a preselected program.

5. A modification unit according to claim 4 wherein said preselected program is a random program.

6. A modification unit according to claim 4 wherein said preselected program is a unidirectional mark to space program.

7. A modification unit according to claim 4 wherein said preselected program is a unidirectional space to mark program.

8. A modification unit according to claim 4 wherein said preselected program is a bidirectional mark to space and space to mark program.

9. A teletype character modification unit comprising: a signal shaper; a synchronization circuit coupled to said shaper; a first delay circuit coupled to said synchronization circuit; a first mark coincidence circuit coupled to said first delay circuit and to said signal shaper; a second delay circuit coupled to said first mark coincidence circuit; a first space coincidence circuit coupled to said second delay circuit and to said shaper; third, fourth and fifth delay circuits coupled to said first space coincidence circuit; first, second and third multiple position switches coupled to said third, fourth, and fifth delay circuits respectively; a second space coincidence circuit coupled to said shaper and to two positions of each of said multiple position switches; and a second mark coincidence circuit coupled to said shaper and to two positions of each said multiple position switch.

10. A teletype character modification unit comprising: a signal shaper; a synchronization circuit coupled to said shaper; a first delay circuit coupled to said synchronization circuit; a first space coincidence circuit coupled to said first delay circuit and to said shaper; a second delay circuit coupled to said first space coincidence circuit; a first mark coincidence circuit coupled to said second delay circuit and to said shaper; a third delay circuit coupled to said first mark coincidence circuit; a second mark coincidence circuit coupled to said shaper and to said third delay circuit; a fourth and a fifth delay circuit coupled to said mark coincidence circuit; first and second multiple position switches coupled to said fourth and fifth delay circuits respectively; a second space coincidence circuit coupled to said shaper and to two positions of each said multiple position switch; and a third mark coincidence circuit coupled to two positions of each said multiple position switch.

11. A teletype character modification unit comprising: a signal shaper; a synchronization circuit coupled to said shaper; first, second, third, fourth and fifth delay circuits coupled to said synchronization circuit; first, second, third, fourth, and fifth multiple position switches coupled to said first, second, third, fourth, and fifth delay circuits respectively, each said switch having at least four switch contact positions, a space coincidence circuit coupled to two positions of each said multiple position switch; and a mark coincidence circuit coupled to two positions of each said multiple position switch.

12. A teletype character modification unit comprising: a signal shaper circuit; a synchronization circuit; a first delay circuit; a first mark coincidence gate coupled to said shaper and to said first delay circuit; a second delay circuit coupled to said first mark gate; a first space coincidence gate coupled to said shaper and to said second delay circuit; third, fourth, and fifth delay circuits coupled to said first space gate; a sixth delay circuit; a second space gate coupled to said sixth delay circuit and to said shaper; a seventh delay circuit coupled to said second space gate; a second mark gate coupled to said shaper and to said seventh delay circuit; an eighth delay circuit coupled to said second mark gate; a third mark coincidence gate coupled to said eighth delay circuit and to said shaper; ninth and tenth delay circuits coupled to said third mark gate; eleventh, twelfth, thirteenth, fourteenth and fifteenth delay circuits having their inputs connected to a common point; a first multiple position switch for individually connecting said first and sixth delay circuits, said common point, and said first and sixth delay circuits in combination to said synchronization circuit; a third space gate; a fourth mark gate; a plurality of multiple position switches for selectively connecting said fourth mark gate and said third space gate to said third, fourth, fifth, ninth, tenth, eleventh, twelfth, thirteenth, fourteenth, and fifteenth delay circuits, said plurality of multiple position switches being wired so that any combination of said delay circuits coupled to said fourth mark gate and said third space gate can be selectively coupled to said fourth mark gate and said third space gate; a readout multivibrator coupled to said third space gate; a reactance tube multivibrator coupled to said fourth mark gate; first and second teletype transmitter distributors; five single-pole, single-throw switches coupled to each said distributor; means to couple said single-pole, single-throw switches to said plurality of multiple position switches; means to couple said single-pole, single-throw switches of said first distributor to said third space gate; means to couple said single-pole, single-throw switches of said second distributor to said fourth mark gate; a first readout relay coupled to said reactance tube multivibrator; a second readout relay coupled to said readout multivibrator; a program multivibrator coupled to said synchronization circuit; a drive motor coupled to said first and second distributors, and a program relay coupled between said drive motor and said program multivibrator.

13. A teletype character modification unit comprising: a signal shaper having an input for receiving teletype mark-space pulses; a synchronization circuit coupled to said shaper; first, second, third, fourth, and fifth delay circuits coupled to said synchronization circuit; a mark coincidence gate; a space coincidence gate; and means coupled between said mark and space gates and said first, second, third, fourth and fifth delay circuits for substituting any desired mark-space pulse for the mark-space pulses received by said shaper.

* * * * *

UNITED STATES PATENT AND TRADEMARK OFFICE
CERTIFICATE OF CORRECTION

PATENT NO. : 4,232,187

DATED : Nov. 4, 1980

INVENTOR(S) : GERALD WEISS, GERSON SCHARF, ANTHONY A. GUIDO and BENJAMIN LAZARDWITZ It is certified that error appears in the above—identified patent and that said Letters Patent is hereby corrected as shown below:

In the title and drawing, change "TELETYPE" (all occurrences) to --- TELETYPEWRITER ---

In the specification and claims, change "teletype" (all occurrences) to --- teletypewriter ---

Signed and Sealed this

Twelfth Day of May 1981

[SEAL]

Attest:

RENE D. TEGTMEYER

Attesting Officer    Acting Commissioner of Patents and Trademarks